United States Patent [19]

Soules et al.

[11] Patent Number: 4,503,488

[45] Date of Patent: Mar. 5, 1985

[54] MULTIPLE HEADLAMP SYSTEM

[75] Inventors: Thomas F. Soules, Cleveland Heights; Milan R. Vukcevich, Burton, both of Ohio

[73] Assignee: General Electric Company, Schenectady, N.Y.

[21] Appl. No.: 630,994

[22] Filed: Jul. 13, 1984

Related U.S. Application Data

[63] Continuation of Ser. No. 401,037, Jul. 22, 1982, abandoned.

[51] Int. Cl.³ ............................................. B60Q 1/26
[52] U.S. Cl. ...................................... 362/80; 362/83; 362/310; 362/238; 362/247; 362/251; 315/83; 315/90; 315/93; 315/96
[58] Field of Search .................. 362/61, 80, 295, 806, 362/251, 211, 212, 238, 240, 241, 247, 251, 310; 315/82, 83, 89, 90, 93, 96; 340/74

[56] References Cited

U.S. PATENT DOCUMENTS

| | | | |
|---|---|---|---|
| 1,130,969 | 3/1915 | Fleet | 315/191 |
| 1,234,028 | 7/1917 | Honsberger | 315/192 X |
| 1,257,618 | 2/1918 | Leone | 315/191 |
| 3,062,951 | 11/1962 | Falge | 240/7.1 |
| 3,179,845 | 4/1965 | Kulwiec | 362/61 X |
| 3,316,441 | 4/1967 | Nallinger | 315/83 |
| 3,535,585 | 10/1970 | Barnum | 315/83 |
| 3,617,795 | 11/1971 | Peek | 315/83 X |
| 3,798,460 | 3/1974 | Takeda et al. | 362/80 X |
| 3,894,227 | 7/1975 | Pitkjaan et al. | 362/61 |

Primary Examiner—Peter A. Nelson
Attorney, Agent, or Firm—John F. McDevitt; Philip L. Schlamp; Fred Jacob

[57] ABSTRACT

A multiple headlamp system for vehicles, comprising at least two individual lamps having their filaments connected in electrical series. This permits the use of shorter filaments and hence smaller diameter reflector lamps, without loss of optical control or reflector efficiency, for use in modern cars having low-profile front ends for providing improved aerodynamic streamlining. In a preferred embodiment, a vehicle is provided with two sets of headlamps, each set comprising a pair of individual headlamps each containing a filament at the focal point of the reflector for achieving maximum optical control, and means for connecting the filaments of each pair in electrical series across the vehicle's battery, one lamp of the pair being designed to provide a narrow-beam "punch" light for distant viewing, and the other lamp of the pair being designed to provide a wide-angle beam "spread" light for general viewing.

5 Claims, 2 Drawing Figures

MULTIPLE HEADLAMP SYSTEM

This application is a continuation of application Ser. No. 401,037, filed July 22, 1982, and now abandoned.

BACKGROUND OF THE INVENTION

The invention is in the field of headlamp systems for vehicles.

Many modern vehicles are customarily equipped with two pairs of headlamps, one pair being at the right, and the other at the left, of the front of the vehicle. Of each pair of headlamps, one contains two filaments, one for high beam and the other for low beam, and the other contains a single filament for high beam. A switching system permits manual energization of only the two low-beam filaments for city driving, and energization of all four high-beam filaments for country driving. Of the high-beam filaments, one of each pair thereof can have its reflector and lens designed to produce a narrow-beam "punch" light for good distant viewing, and the other lens and reflector of the pair can be designed to provide a wide-beam "spread" light for general viewing. Each filament is conventionally designed for 12-volt operation, and is connected across a 12-volt vehicle battery for energization. The modern compact rectangular headlamp, for a four-headlamp system, has a front dimension of about four inches high and about six and one-half inches wide. The four-inch height of the headlamps limits the low-profile aerodynamic streamlining of the front end of vehicles from the theoretically desirable front-end tapering to a very small or zero vertical dimension for reducing air drag and improving gasoline mileage. An expedient is to recess the headlamps rearwardly and provide a sloped streamlined window in front of them, but this increases cost and reduces optical efficieny. Optical efficiency also is reduced by having two filaments in one lamp; only one of these filaments can be at the focal point for achieving maximum effectiveness of beam control, and furthermore, each filament undesirably shields and blocks some of the light from the other filament, both some of its direct light and some of its reflected light.

U.S. Pat. No. 3,062,951 to Falge discloses a four headlamp system for providing high and low beams, and U.S. Pat. No. 3,894,227 to Pitkjaan discloses a four headlamp system for providing high, medium, and low beams.

SUMMARY OF THE INVENTION

Objects of the invention are to provide an improved vehicle headlamp system, and to provide a low-profile headlamp system to permit improved aerodynamic streamlining of vehicles so as to reduce fuel consumption.

The invention comprises, briefly and in a preferred embodiment, a vehicle headlamp system having at least two individual reflector lamps each containing a filament, and means connecting the filaments in electrical series across the vehicle's battery. The invention thus achieves shorter filaments and smaller diameter reflectors, without loss in optical control or reflector efficiency, for use in modern cars having low-profile front ends for improved aerodynamic streamlining. In a preferred embodiment, a vehicle is provided with two sets of headlamps, each set comprising a pair of individual headlamps each containing a filament at the focal point of the reflector for achieving maximum optical control or reflector efficiency, and means for connecting the filaments of each pair in electrical series across the vehicle's battery. One lamp of each pair may be designed to provide a strong narrow-beam "punch" light for good distant viewing, and the other lamp of each pair may be designed to provide a wide-angle beam "spread" light for general viewing.

The invention achieves the beneficial result of a plurality of headlamps having diameters or heights of three inches or less, arranged in a horizontal configuration to provide a profile height of three inches or less, which is a reduction of at least one-fourth profile height compared to the conventional compact four-inch high rectangular headlamp, and a reduction of at least half profile height compared to the conventional six-inch diameter round headlamp for two-headlamp systems.

DESCRIPTION OF THE PREFERRED EMBODIMENTS

Figure 1:
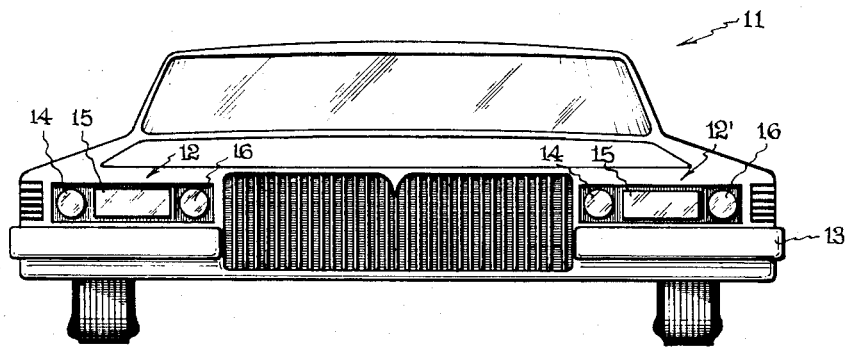
FIG. 1 is a front view of a vehicle provided with a headlamp system in accordance with a preferred embodiment of the invention.
Figure 2:
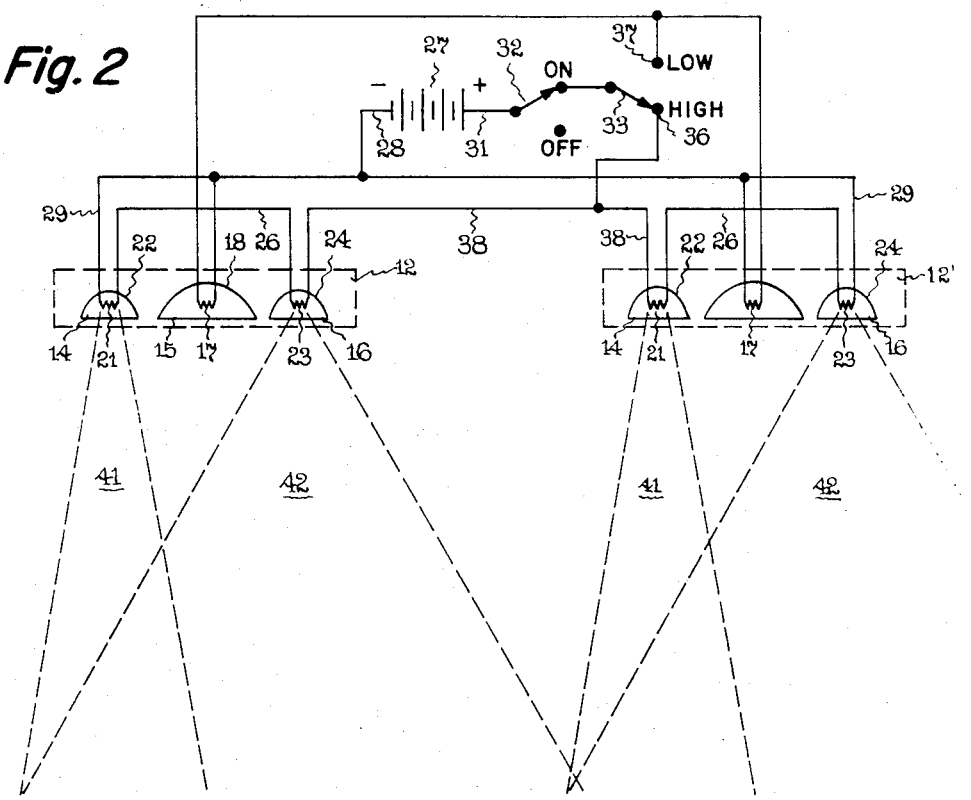
FIG. 2 is a top view of the headlamps in diagrammatic form, along with an electrical schematic diagram of a preferred wiring and switching circuit.

In FIG. 1, a vehicle 11, such as an automobile, is provided with first and second sets 12 and 12' of headlamps respectively near the left and right sides at the front of the vehicle and preferably immediately above the bumper 13. Each of the sets of headlamps 12, 12' preferably is identical and comprises three individual headlamps 14, 15, and 16 arranged horizontally. The center lamp 15 of each set is a low-beam lamp, preferably no more than three inches high, containing a 12-volt filament 17 at or near the focal point of a reflector 18. The lamps 14 and 16 are high-beam lamps. Each of the high-beam headlamps 14 contains a six-volt filament 21 centered at the focal point of a reflector 22, and each of the other high-beam headlamps 16 contains a six-volt filament 23 centered at the focal point of a reflector 24. Each of the pair of high-beam lamp's six-volt filaments 21 and 23 is connected in electrical series by a wire 26. The vehicle's 12-volt battery 27 has its negative terminal 28 connected to an electrically outer end 29 of each of the series-connected high-beam filaments 21, 23 and also to an end of each of the low-beam filaments 17. The negative terminal 31 of battery 27 is connected via an on-off switch 32 of a High-Low switch 33 having a high output terminal 36 and a low output terminal 37. The "high" output terminal 36 is connected to the remaining ends 38 of the series-connected high-beam filaments 21, 23, and the "low" output terminal 37 is connected to the remaining ends of the low-beam filaments 17. The on-off switch 32 can be eliminated if the high-low switch 33 is provided with an "off" unconnected position.

In accordance with the invention, the filaments 21 and 23 of the high-beam lamps 14 and 16 are each approximately half the length of conventional 12-volt filaments, and the diameters of the reflectors 22, 24 and hence of the headlamps 14, 16 are approximately half of that required for approximately equal optical efficiency as to brightness and desired beam distribution pattern, as for conventional headlamps having 12-volt filaments. This is due to the well-known principle that the longer the filament (either transverse to or axially of the reflector's optical axis), the larger the reflector must be to achieve desired beam control and light distribution of the reflected and projected beam of light.

In addition to the invention's achievement of smaller diameter and lower profile aerodynamic headlamps, each of the two headlamps 14 and 16 of each set thereof can be designed and tailored to provide desired beam distribution patterns. For example, the reflectors 22 of lamps 14 and the lenses thereof, can be made to provide a bright narrow "punch" light beam 41 for good distant viewing by the vehicle driver, and the reflectors 24 of lamps 16 and the lenses in front thereof, can be made to provide a wide-angle "spread" light beam 42 for general viewing by the vehicle driver. All of these light beams 41, 42 essentially merge together at the vehicle driver's viewing distances, the two beams 41 together providing a centered "punch" light and the two beams 42 together providing the "spread" light.

It will be apparent that the invention achieves its objectives of providing a vehicle headlamp system of low profile, permitting a lower tapered vehicle front end for improved aerodynamic streamlining and hence improved fuel economy, without sacrificing optical and electrical efficiency. Various modifications can be provided such as a choice of round or rectangular lamps, and the series-connected dual lamp principle of the high-beam lamps 14, 16 can be applied to the low-beam lamps 15. The series-connected filaments 21, 23 need not be of equal lengths and/or voltage requirements, and can be of different voltages which add up to the 12 volts or other voltage of the vehicle's battery voltage. Also, more than two lamps can have their filaments connected in electrical series, the reflectors and lenses of these lamps being designed for various projected light beam pattern characteristics.

While preferred embodiments and modifications of the invention have been shown and described, various other embodiments and modifications thereof will become apparent to persons skilled in the art and will fall within the scope of the invention as defined in the following claims.

What we claim as new and desire to secure by Letters Patent of the United States is:

1. A vehicle headlamp system for connection to a voltage source, comprising first and second sets of headlamps respectively located near the left and right side at the front of the vehicle, each of said first and second sets of headlamps comprising a plurality of individual headlamps each containing a single filament located at the focal point of the reflector member in said individual headlamps, one of the headlamps in each set being designed to provide a relatively narrow beam for "punch" light and having a shorter length filament and reduced diameter reflector than the filament and reflector in the other of said headlamps providing a relatively wide beam for "spread" general lighting, means connecting the filaments of equal length in series for each of said first and second sets of headlamps, and means for connecting said series-connected filaments across said voltage source, wherein comparative optical efficiency to that of conventional headlamps is obtain with reflectors of reduced diameter and filaments of reduced length.

2. A headlamp system as claimed in claim 1, in which each of said filaments is designed to operate at six volts, and in which said voltage source is 12 volts.

3. A headlamp system as claimed in claim 1, in which each of said headlamps is no more than three inches in vertical height.

4. A headlamp system as claimed in claim 1, in which said headlamps are designed to provide high-beam light patterns, said system further including headlamps for providing a low-beam light pattern.

5. A vehicle headlamp system for connection to a voltage source, comprising first and second sets of headlamps respectively, located near the left and right sides at the front of the vehicle, each of said first and second sets of headlamps comprising a plurality of individual headlamps each containing a single filament located at the focal point of the reflector member in said individual headlamps, a pair of headlamps in each set being designed to provide a relatively narrow beam for "punch" light and having a shorter length filament and reduced diameter reflector than the filament and reflector in a third headlamp in each set providing a relatively wide beam for "spread" general lighting, means connecting the filaments of equal length in series for each of said first and second sets of headlamps, and means for connecting said series-connected filaments across said voltage source, wherein comparative optical efficiency to that of conventional headlamps is obtain with reflectors of reduced diameter and filaments of reduced length.

* * * * *